(12) United States Patent
Jung et al.

(10) Patent No.: US 11,732,953 B2
(45) Date of Patent: *Aug. 22, 2023

(54) REFRIGERATOR

(71) Applicant: LG Electronics Inc., Seoul (KR)

(72) Inventors: Wonyeong Jung, Seoul (KR);
Deokhyun Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,749

(22) Filed: Mar. 2, 2022

(65) Prior Publication Data
US 2022/0187010 A1 Jun. 16, 2022

Related U.S. Application Data

(63) Continuation of application No. 16/445,425, filed on Jun. 19, 2019, now Pat. No. 11,346,594, which is a
(Continued)

(30) Foreign Application Priority Data

Nov. 2, 2011 (KR) .......................... 10-2011-0113413
Nov. 2, 2011 (KR) .......................... 10-2011-0113414

(51) Int. Cl.
*F25D 23/06* (2006.01)

(52) U.S. Cl.
CPC .... *F25D 23/062* (2013.01); *F25D 2201/1282* (2013.01); *F25D 2201/14* (2013.01)

(58) Field of Classification Search
CPC ............... F25D 23/062; F25D 2201/14; F25D 2201/1282

USPC ............. 220/592.27, 592.2, 592.09, 592.05, 220/592.11, 59.06, 592.21, 592.02, 220/592.26; 217/129

See application file for complete search history.

(56) References Cited

U.S. PATENT DOCUMENTS 1,518,668 A 12/1924 Mitchell
1,541,945 A 6/1925 Hamilton
(Continued)

FOREIGN PATENT DOCUMENTS

CN 85106738 6/1986
CN 2033487 3/1989
(Continued)

OTHER PUBLICATIONS

U.S. Office Action dated Jan. 28, 2014 for U.S. Appl. No. 13/654,566, 18 pages.
(Continued)

*Primary Examiner* — Jeffrey R Allen
(74) *Attorney, Agent, or Firm* — Fish & Richardson P.C.

(57) ABSTRACT

There is disclosed a refrigerator including a vacuum space formed between an outer case and an inner case to improve an insulation function thereof, which includes an inner case that defines an exterior appearance of a storage space, an outer case spaced apart a predetermined distance from the inner case, a vacuum space provided between the inner case and the outer case, with being maintained vacuum, to insulate the inner case from the outer case, a plurality of spacers for supporting the inner case and the outer case space that are spaced apart from each other, and a radiation blocking film provided in the vacuum space, spaced apart from the inner case and the outer case.

19 Claims, 9 Drawing Sheets

Related U.S. Application Data continuation of application No. 15/375,308, filed on Dec. 12, 2016, now Pat. No. 10,330,373, which is a continuation of application No. 13/654,551, filed on Oct. 18, 2012, now Pat. No. 9,528,749.

(56) References Cited

U.S. PATENT DOCUMENTS

| | | |
|---|---|---|
| 1,561,769 A | 11/1925 | Ballew |
| 1,588,707 A | 6/1926 | Alexander |
| 1,747,969 A | 2/1930 | Carrey |
| 1,770,200 A | 7/1930 | Comstock |
| 1,814,114 A | 7/1931 | Light |
| 1,833,633 A | 11/1931 | Light |
| 1,993,730 A | 3/1935 | Carpenter |
| 2,000,882 A | 5/1935 | Comstock |
| 2,044,600 A | 6/1936 | Williams |
| 2,053,252 A | 9/1936 | Cook et al. |
| 2,102,698 A | 12/1937 | Gould |
| 2,196,373 A | 4/1940 | Wallach |
| 2,773,362 A | 12/1956 | Scheitlin |
| 3,161,265 A | 12/1964 | Matsch |
| 4,036,617 A | 7/1977 | Leonard et al. |
| 4,147,037 A | 4/1979 | Gelbard et al. |
| 4,301,658 A | 11/1981 | Reed |
| 4,526,015 A | 7/1985 | Laskaris |
| 4,959,111 A | 9/1990 | Kruck |
| 5,081,761 A | 1/1992 | Rinehart et al. |
| 5,157,893 A | 10/1992 | Benson et al. |
| 5,175,975 A | 1/1993 | Benson et al. |
| 6,037,033 A | 3/2000 | Hunter |
| 6,073,944 A | 6/2000 | Moore |
| 6,257,684 B1 | 7/2001 | Hirath et al. |
| 6,393,798 B1 | 5/2002 | Hirath et al. |
| 6,479,112 B1 | 11/2002 | Shukuri et al. |
| 6,938,968 B2 | 9/2005 | Tanimoto et al. |
| 7,003,973 B2 | 2/2006 | Lee et al. |
| 7,806,955 B2 | 10/2010 | Wang et al. |
| 2001/0055478 A1 | 12/2001 | Scherzer et al. |
| 2003/0167789 A1 | 9/2003 | Tanimoto et al. |
| 2005/0175809 A1 | 8/2005 | Hirai et al. |
| 2005/0200252 A1 | 9/2005 | Muller et al. |
| 2007/0214824 A1 | 9/2007 | Itsuki |
| 2010/0251653 A1 | 10/2010 | Mills |
| 2011/0259040 A1 | 10/2011 | Cataldo et al. |
| 2012/0060543 A1 | 3/2012 | Hanely et al. |
| 2012/0104002 A1 | 5/2012 | Jung et al. |
| 2013/0029082 A1 | 1/2013 | Park |

FOREIGN PATENT DOCUMENTS

| | | |
|---|---|---|
| CN | 2226260 | 5/1996 |
| CN | 2241851 | 12/1996 |
| CN | 1536305 | 10/2004 |
| CN | 2720362 | 8/2005 |
| CN | 2777463 | 5/2006 |
| CN | 101038121 | 9/2007 |
| CN | 101487652 | 7/2009 |
| CN | 101595340 | 12/2009 |
| CN | 101793455 | 8/2010 |
| EP | 0071090 | 2/1983 |
| EP | 1835242 | 9/2007 |
| JP | 2005147591 | 6/2005 |
| JP | 2005163848 | 6/2005 |
| KR | 1020050102449 | 10/2005 |
| KR | 20110015327 | 2/2011 |
| NL | 1005962 | 11/1998 |
| WO | WO2011016693 | 2/2011 |

OTHER PUBLICATIONS

U.S. Office Action dated Jun. 27, 2014 for U.S. Appl. No. 13/665,057, 14 pages.
Chinese Office Action dated Jul. 7, 2014 for Chinese Application No. 201210428777.9, with English Translation, 26 pages.
Chinese Office Action dated Jul. 24, 2014 for Chinese Application No. 201210432112.5, with English Translation, 21 pages.
U.S. Office Action dated Dec. 15, 2014 for U.S. Appl. No. 13/654,551, 11 Pages.
U.S. Office Action dated Mar. 5, 2015 for U.S. Appl. No. 13/655,677, 18 pages.
Extended European Search Report in European Application No. 12007269.9, dated Apr. 21, 2017, 7 pages (with English translation).
Chinese Office Action dated Aug. 1, 2014 for Chinese Application. No. 201210433194.5, with English Translation, 17 pages.
U.S. Final Office Action dated Aug. 31, 2015, for U.S. Appl. No. 13/655,677, 37 pages.
Notice of Allowance in Korean Appln. No. 10-2021-0129878, dated Oct. 18, 2022, 5 pages (with English translation).

REFRIGERATOR

CROSS-REFERENCE TO RELATED APPLICATIONS

This application is a continuation of U.S. application Ser. No. 16/445,425, filed on Jun. 19, 2019, which is a continuation of U.S. application Ser. No. 15/375,308, filed on Dec. 12, 2016, now U.S. Pat. No. 10,330,373, which is a continuation of U.S. application Ser. No. 13/654,551, filed on Oct. 18, 2012, now U.S. Pat. No. 9,528,749, which claims priority to Korean Application Nos. 10-2011-0113413 and 10-2011-0113414 both filed on Nov. 2, 2011, all of which are incorporated herein by reference.

BACKGROUND

1. Field

Embodiments of the invention relate to a refrigerator, more particularly, to a refrigerator including a vacuum space formed between an outer case and an inner case to improve an insulation function thereof.

2. Background

A refrigerator is an electric home appliance can keep food stored in a storage compartment at a low temperature or a temperature below zero, using a refrigerant cycle.

A conventional configuration of such a refrigerator is provided with a case where a storage space is defined to store foods and a door rotatably or slidingly coupled to the case to open and close the storage space.

The case includes an inner case where the storage space is formed and an outer case configured to accommodate the inner case. An insulating material is arranged between the inner case and the outer case.

Such an insulating material suppresses the outdoor temperature from affecting an internal temperature of the storage space.

An example of the insulation material is urethane foams. Such urethane foams can be injection-foamed in the space formed between the inner and outer cases.

In this instance, to realize an insulation effect by using such the insulating material, a predetermined thickness of the insulating material has to be secured and that means that the insulating material becomes thick. Accordingly, a wall between the inner and outer cases becomes thick and the size of the refrigerator is increased as much as the thickness.

However, as a recent trend of a compact-sized refrigerator is one the rise, there is the need for the structure of the refrigerator that can make the volume of the internal storage space larger and the external size smaller.

SUMMARY

To solve the problems, an object of the invention is to provide a refrigerator that is able to improve an insulation effect by forming the vacuum space between the inner case and the outer case and to promote a compact volume.

Another object of the present invention is to provide a refrigerator that is able to form the vacuum space between the inner case and the outer case and that has a supporting structure to maintain the distance between the inner case and the outer case, without deformation of the inner and outer cases generated by an external shock.

A further object of the present invention is to provide a refrigerator that is able to reduce radiation heat transfer via the vacuum space formed between the inner case and the outer case as much as possible.

To achieve these objects and other advantages and in accordance with the purpose of the embodiments, as embodied and broadly described herein, 1. a refrigerator comprises an inner case that defines a storage space; an outer case spaced apart a distance from the inner case, the outer case and the inner case defining, between the outer case and the inner case, a vacuum space that is maintained at a partial vacuum pressure and that is configured to insulate the inner case from the outer case; a plurality of spacers that are spaced apart from each other and that maintain the vacuum space between the inner case and the outer case; and a radiation blocking film provided in the vacuum space, spaced apart from the inner case and the outer case.

The radiation blocking film may comprise an aluminum thin film.

A thickness of the radiation blocking film may be 0.05~0.30 mm.

A plurality of radiation blocking films may be provided in the vacuum space, spaced apart a distance from each other and the inner case and the outer case.

The plurality of spacers may pass through the radiation blocking film.

The radiation blocking film may comprise a plurality of through-holes that enable the plurality of spacers to pass through the radiation blocking film.

The refrigerator may further comprise a first support plate provided at a surface of the inner case that faces the outer case; and a second support plate provided at a surface of the outer case that faces the first support plate, wherein the plurality of spacers are fixed to at least one of the first support plate and the second support plate.

The refrigerator may further comprise a distance keeping member positioned at one or more of the plurality of spacers to maintain a distance between the first support plate and the radiation blocking film and a distance between the radiation blocking film and the second support plate.

The distance keeping member may have a predetermined height and the distance keeping member is provided in an outer circumference of the one or more spacers.

The refrigerator may further comprises a plurality of distance keeping members that are connected with each other by a connection rib to define a set of distance keeping members.

Two radiation blocking films may be provided, and the plurality of the distance keeping members may be arranged between the two radiation blocking films.

An inner surface of the distance keeping member may be inclined and the distance keeping member is coupled to an outer circumferential surface of the one or more spacers.

The distance keeping member may be inclined to reduce a contact area with at least one of the first support plate and the second support plate.

At least one of the first support plate and the second support plate may comprise a plurality of holes defining empty spaces between each two of the spacers.

A reinforcing rib may be provided in a hole to connect the plurality of spacers with each other.

In another aspect of the present invention, a refrigerator comprises an inner case that defines a storage space; an outer case spaced apart a distance from the inner case, the outer case and the inner case defining, between the outer case and the inner case, a vacuum space that is maintained at a partial vacuum pressure and that is configured to insulate the inner case from the outer case; a plurality of spacers that are spaced apart from each other and that maintain the vacuum space between the inner case and the outer case; a first radiation blocking film provided in the vacuum space, spaced apart from the inner case and the outer case; a second radiation blocking film provided in the vacuum space, spaced apart from the inner case and the outer case; and a distance keeping member that is provided between the first radiation blocking film and the second radiation blocking film and that maintains the first radiation blocking film and the second radiation blocking film spaced apart a distance from each other.

The distance keeping member may support the first radiation blocking film and the second radiation blocking film and maintains the first radiation blocking film and the second radiation blocking film spaced apart from the inner case and the outer case.

The distance keeping member may be coupled to the plurality of spacers.

In another aspect of the present invention, a refrigerator comprises an inner case that defines a storage space; an outer case spaced apart a distance from the inner case, the outer case and the inner case defining, between the outer case and the inner case, a vacuum space that is maintained at a partial vacuum pressure and that is configured to insulate the inner case from the outer case; a first support plate provided at a surface of at least one of the inner case and the outer case that faces the vacuum space; and a plurality of spacers that are fixed to the first support plate, that are configured to support the first support plate, and that are configured to maintain the distance between the inner case and the outer case.

The refrigerator may further comprise a metal coated part that is provided on the first support plate and that is configured to block radiant heat transfer.

The refrigerator according to embodiments has following advantageous effects. According to the refrigerator, the vacuum space is formed between the inner case and the outer case, instead of the conventional insulating material. Such the vacuum space performs the insulation to restrain heat transfer between the inner case and the outer case.

The insulation effect of the vacuum state is more excellent than the conventional insulating material. The refrigerator according to the present invention has an advantage of excellent insulation, compared with the insulation effect achieved by the conventional insulating material the conventional refrigerator. The refrigerator according to the present invention has an advantage of good insulation, compared with the conventional refrigerator.

Meanwhile, if the vacuum state of the vacuum space is maintained, the insulation function is performed, regardless of the thickness (the distance between the inner case and the outer case). However, the thickness of the conventional insulating material has to be larger to enhance the insulating effect and such increase of the thickness results in increase of the refrigerator size.

Accordingly, the refrigerator according to the present invention may minimize the heat transfer conducted by rare gas existent in the vacuum space formed between the inner case and the outer case. Accordingly, the refrigerator according to the present invention may have the good insulating effect.

Still further, a radiation blocking film is provided between the inner case and the outer case to cut off radiant heat transfer. Accordingly, the heat transfer generated by the radiation as well as the heat generated by the conduction or convection can be reduced as much as possible, and the refrigerator according to the present invention can have an improved insulation effect.

Still further, the vacuum space is formed between the inner case and the outer case in the refrigerator according to the present invention. Together with that, the inner case and the outer case cannot be deformed by an external shock, with maintaining the distance.

The refrigerator according to the present invention may provide the structure which can facilitate the assembling work of the parts such as the inner and outer cases forming the vacuum space, one or more radiation blocking film and the spacers. Accordingly, workability of the refrigerator may be enhanced.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Exemplary embodiments of the present invention will be described in detail, referring to the accompanying drawing figures which form a part hereof.

Figure 1:
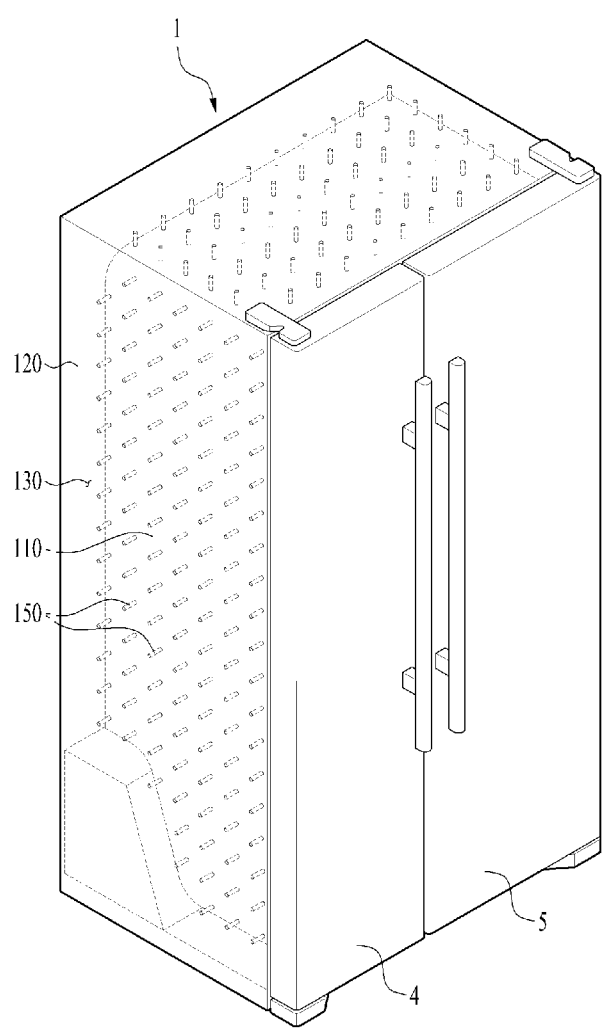
FIG. 1 is a perspective view of a refrigerator according to one embodiment of the present invention.
Figure 2:
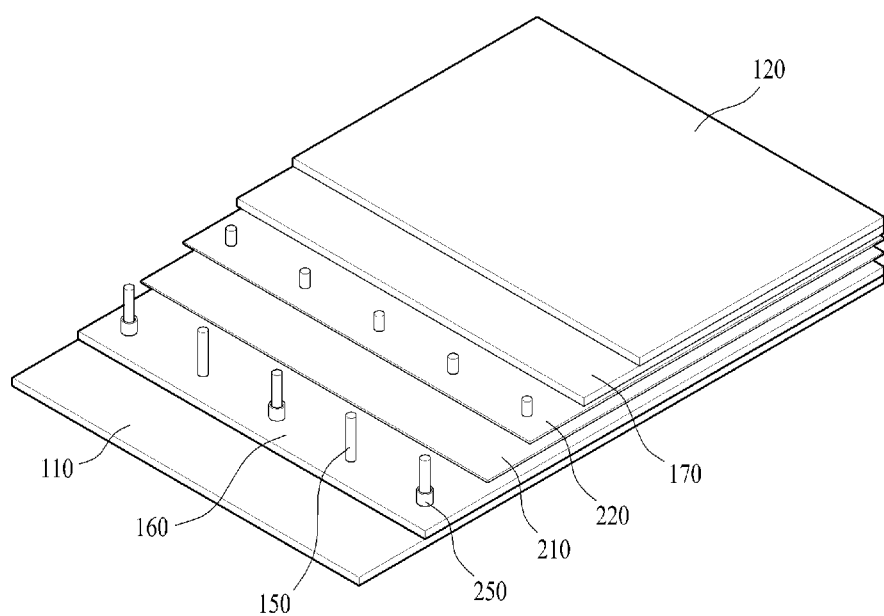
FIG. 2 is a partially cut-away perspective view illustrating various parts provided between the inner case and the outer case.

FIG. 1 illustrates a refrigerator according to one embodiment of the present invention. FIG. 2 is a partially cut-away perspective view illustrating various parts provided between the inner case and the outer case.

As shown in FIG. 1, the refrigerator according to one embodiment of the present invention includes a case 1 in which a storage chamber is formed, a first door 4 rotatably coupled to a left side of the case 1 and a second door 5 rotatably coupled to right side of the case 1.

The first door 4 is configured to open and close a freezer compartment that consists of the storage compartment and the second door 5 is configured to open and close a refrigerator compartment that consists of the storage compartment. By nonlimiting example, the present invention may include various types of refrigerator.

In other words, the refrigerator shown in FIG. 1 is a side-by-side type having a refrigerator compartment arranged on the left and a freezer compartment arranged on the right. The refrigerator according to the present invention may be all types of refrigerators no matter how the refrigerator and freezer compartments are arranged. Also, the refrigerator may be a refrigerator only having a refrigerator or freezer compartment or a refrigerator having an auxiliary cooler compartment rather than the freezer and refrigerator compartments.

As shown in FIGS. 1 and 2, the refrigerator according to the present invention includes an inner case 110 in which the storage space is formed, an outer case 120 accommodating the inner case, spaced apart a predetermined distance from the inner case, and a vacuum space 130 provided between the inner case and the outer case, with being closed to maintain a vacuum state to perform the insulation function between the inner case and the outer case.

At this time, one or more radiation blocking film 210 and 220 may be provided in the vacuum space 130, spaced apart a predetermined distance from the inner and outer cases. The radiation blocking film is configured to reduce radiant heat transferred via the vacuum space.

The outer case 120 is spaced apart a predetermined distance from the inner case 110. No auxiliary insulating material is provided in a space formed between the outer case 120 and the inner case 110 and the space is maintained in a vacuum state to perform insulation.

In other words, the vacuum space 130 is formed between the outer case 120 and the inner case 110, to remove a medium that delivers the heat between the cases 110 and 120.

Accordingly, the heat from the hot air outside the outer case 120 can be prevented from being transmitted to the inner case as it is.

Meanwhile, for convenience sake, FIG. shows that the inner case 110, the outer case 120 and spacers 150, in a state where a first support plate 160, a second support plate 170 and the radiation blocking films 210 and 220 are omitted.

It is preferred that the one or more radiation blocking film 210 and 220 is provided in the vacuum space 130 to reduce the heat transfer generated by radiation, spaced apart from the inner and outer cases.

To prevent the heat transfer generated by the radiation within the vacuum space 130 formed between the inner case 110 and the outer case 120, the one or more radiation blocking film 210 and 220 may be arranged distant from the outer case 120 and the inner case 110.

Such the radiation blocking film 210 and 220 is a metal thin film having a low emissivity configured to cut off radiant heat transfer.

There are well-known techniques of cut off radiant heat transfer by coating such a material as silver or copper on an inner surface of a thermos and the like using conventional vacuum insulation. However, when the radiation blocking films are arranged in the vacuum space according to the present invention, the effect of blocking heat transfer is improved much more in comparison to plating or coating of a metal material on an inner surface of the vacuum space.

Accordingly, the radiation blocking film 210 and 220 configured of a metal thin film is arranged in the vacuum space 130 distant from the outer case 120 and the inner case 110.

It is preferred that the radiation blocking film 210 and 220 is formed of an aluminum thin film.

The price of such aluminum is relatively low, compared with that of silver or copper. When the aluminum is used, the manufacturing cost is low and the emissivity is substantially similar to that of the conventional coating or plating of silver or copper.

Moreover, the thickness of the radiation blocking film 210 and 220 may be 0.05~0.30 mm.

The radiation blocking films 210 and 220 can be arranged distant from the outer case 120 and the inner case 110, respectively, and they should have a predetermined strength to endure deformation generated by the weight or external shock.

The shape of the radiation blocking film can be maintained by the spacers 150 which will be described later, when the radiation blocking film has the thickness of 0.05~0.30 mm.

A plurality of the spacers 150 may be arranged to maintain the distance between the inner case 110 and the outer case 120 to make the vacuum space 130 maintain its profile. Such spacers 150 may support the first support plate to maintain the distance between the inner case 110 and the outer case 120.

The plurality of the spacers 150 may be fixed between the inner case 110 and the outer case 120. The plurality of the spacers 150 may be arranged in the first support plate 160 as a fixing structure.

The first support plate 160 may be provided in contact with one of facing surfaces possessed by the inner and outer cases 110 and 120.

In FIG. 2, it is shown that the first support plate 160 is arranged to contact with an outer surface of the inner case 110. Optionally, the first support plate 160 may be arranged to contact with an inner surface of the outer case 120.

The case 1 may further include a second support plate 170 provided in the other one of facing surfaces possessed by the first and second cases 110 and 120, with facing the first support plate.

In the embodiment shown in FIG. 2, the second support plate 170 is arranged to contact with the inner surface of the outer case 20 and the spacers 150 are fixedly arranged in the first support plate 160 to maintain a distance spaced apart between the first support plate 160 and the second support plate 170.

The first support plate 160 is in contact with the outer surface of the inner case 110 and the second support plate 170 is in contact with the inner surface of the outer case 120. Accordingly, the spacers 150 supportably maintain the distance between the inner case 110 and the outer case 120.

In the embodiment shown in FIG. 2, the second support plate 170 is spaced apart a predetermined distance from the first support plate 160. However, only the first support plate 160 where the spacers 150 are integrally fixed may be provided between the inner case 110 and the second case 120. In case of no second support plate 170 as mentioned above, ends of the spacers 150 may be arranged to directly contact with the inner surface of the outer case 120.

Meanwhile, for convenience sake, FIG. 1 shows only the inner case 110, the outer case 120 and the spacers 150, without the first support plate 160 and the second support plate 170.

The vacuum space 130 has to be formed between the inner and outer cases 110 and 120 composing the case 1. For instance, rim portions of the inner and outer cases 110 and 120 that form one surface of the case 1 have to be integrally formed with each other, with the corresponding size to the size of the one surface.

In contrast, first and second support plate units are fabricated, with a smaller size than the size of the inner or outer case 110 or 120. After that, sets of assembled first and second support plates having the spacers 150 positioned there between are fabricated and the sets of the assembled plates are inserted between the inner case 110 and the outer case 120.

Optionally, the first support plate 160 and the second support plate 170 are fabricated and assembled, with the same size as the inner and outer cases 110 and 120.

FIG. 2 partially illustrates the assembling structure between the inner case 110 and the outer case 120 in a multilayered structure.

It will be understood that the assembled structures from the first support plate 160 to the second support plate 170 are substantially multilayered between the inner case 110 and the outer case 120.

Hence, referring to FIGS. 3 to 5, the structure and assembling method among the first support plate, the spacers, the radiation blocking films and the second support plate will be described in detail.

Figure 3:
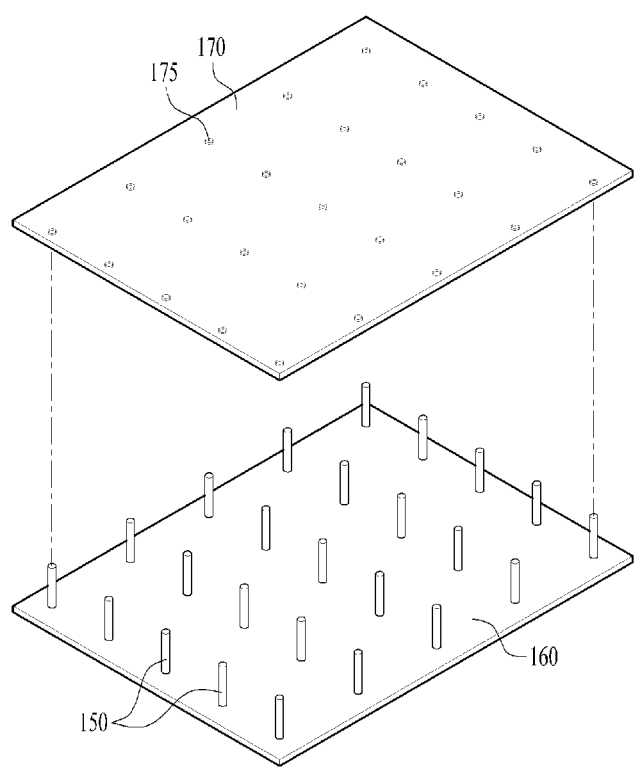
FIG. 3 is a perspective view illustrating an assembling process of a first support plate, spacers and a second support plate shown in FIG. 2.

FIG. 3 is a perspective view illustrating an assembling process of a first support plate, spacers and a second support plate shown in FIG. 2. FIG. 4 is a perspective view illustrating distance keeping members provided between some of the spacers formed in the first support plate of FIG. 2. FIG. 5 is a perspective view illustrating the radiation blocking film of FIG. 2.

Referring to FIG. 3, the second support plate 170 may include a plurality of grooves formed in an inner surface thereof to insert ends of the spacers therein, respectively.

The plurality of the grooves 175 formed in the second support plate 170 may facilitate the fixing of relative position with respect to the spacers 150, when the second support plate 170 is placed on the spacers 150 integrally formed with the first support plate 160.

Figure 5:
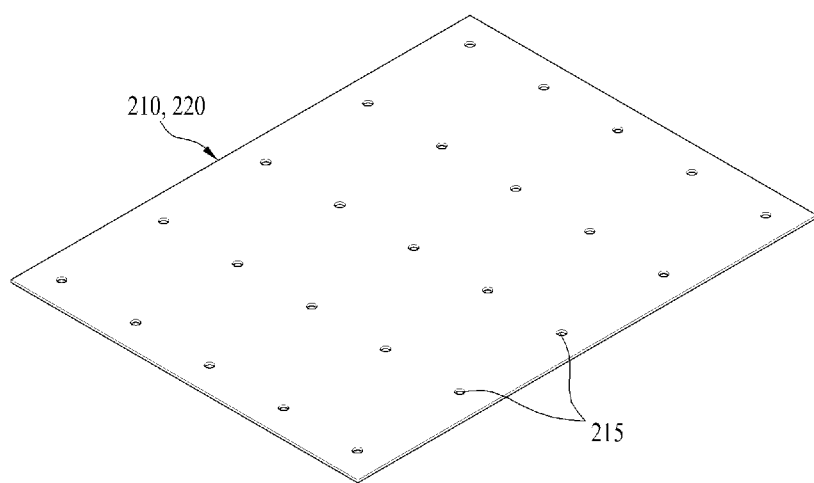
FIG. 5 is a perspective view illustrating the radiation blocking film of FIG. 2.

As shown in FIG. 5, the radiation blocking film includes a plurality of through-holes 215 formed to pass the plurality of the spacers there through, respectively.

The plurality of the spacers 150 may pass through the through-holes 215 and the through-holes may be formed at positions corresponding to the spacers, respectively.

As the spacers are aligned in vertical and horizontal lines, the through-holes 215 are correspondingly aligned in vertical and horizontal lines.

A plurality of distance keeping members 250 may be provided in a predetermined number of the spacers 150 to keep a distance between the first support plate 160 and the radiation blocking film 210 and a distance between the radiation blocking film 210 and the second support plate 170, respectively.

The distance keeping members 250 may be provided in the spacers 150, respectively. However, the radiation blocking film 210 formed of a metal thin film with a predetermined thickness will not come down because of its metal properties. It is preferred that the distance keeping members 250 are arranged in a predetermined number of the spacers 150.

If the distance keeping members 250 are provided in the spacers 150, respectively, heat is likely conducted via the spacers 150 and the distance keeping members 250. Accordingly, it is more preferred that the distance keeping members 250 are provided in only the predetermined number of the spacers 150.

Two radiation blocking films 210 and 220 are provided in the vacuum space 130 in parallel, spaced apart a predetermined distance from each other. The distance keeping members 250 may be provided in one surface and the other opposite surface of the radiation blocking films 210 and 220, respectively.

As shown in FIG. 2, in the vacuum space 130 formed in between the inner case 210 and the outer case 120 may be inserted the structures including the first support plate 160, the second support plate 170 and the spacers and the two radiation blocking films 210 and 220 arranged between the first support plate 160 and the second support plate 170.

As mentioned above, the spacers 150 are integrally formed with a surface of the first support plate 160, being projected in lines vertically and horizontally.

Figure 4:
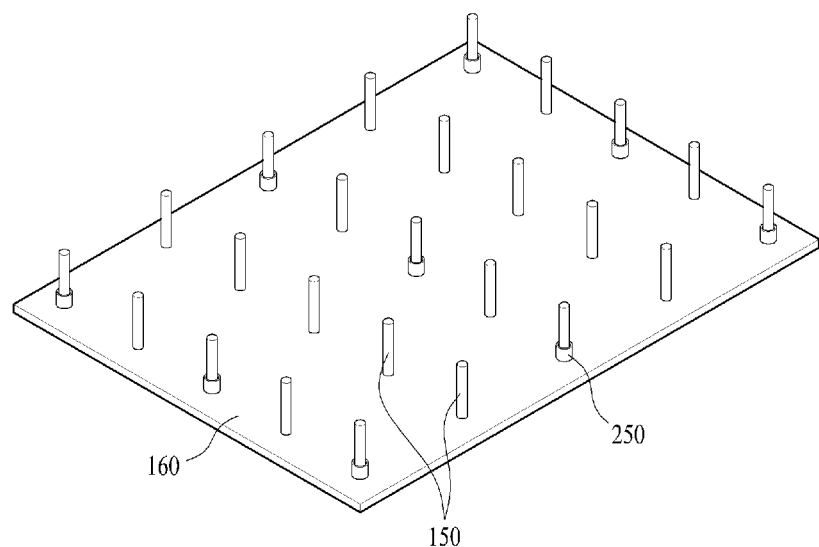
FIG. 4 is a perspective view illustrating distance keeping members provided between some of the spacers formed in the first support plate of FIG. 2.

As shown in FIG. 4, the distance keeping members 250 may be arranged to be inserted in the predetermined number of the spacers 150 formed in the first support plate 160.

The distance keeping members 250 may be bosses having a predetermined height arranged on outer circumferences of the spacers 150.

In this instance, the distance keeping member 250 integrally formed with the space 150 is arranged between the first support plate 160 and the first radiation blocking film 210 disposed on the first support plate 160.

The distance keeping member 250 is a boss type inserted in the outer circumferential surface of the space 150, namely, a hollow cylinder type. Accordingly, the distance keeping member 250 may be larger than or identical to a diameter of the space 150.

The spacers 150 have to pass through the through-holes 215 formed in the radiation blocking film 210 and 220, respectively, such that a diameter of the through-hole 215 may be larger than or identical to the spacer 150.

The diameter of the through hole 215 formed in the radiation blocking film 210 and 220 may be larger than the diameter of the space 150 and smaller than an external diameter of the distance keeping member 250.

Accordingly, when the diameter of the through-hole 215 is larger than the diameter of the space 150 and smaller than the external diameter of the distance keeping member 250, the spacer 150 may pass the through hole 125 and the radiation blocking film 210 may be supported by an upper surface of the distance keeping member 250.

Moreover, the radiation blocking film 210 and 220 may not contact with the spacer 150, to prevent heat transfer generated by conduction. It is preferred that the diameter of the through hole 215 is identical to the external diameter of the spacer 150.

Figure 6:
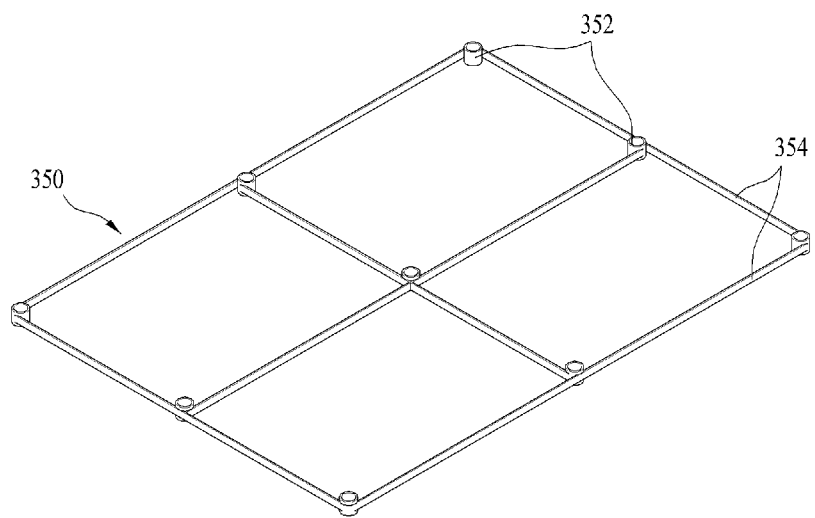
FIG. 6 is a perspective view illustrating sets of distance keeping members integrally connected with each other.

As shown in FIG. 6, a set of distance keeping members 350 arranged between the pair of the radiation blocking films 210 and 220 may be connected with each other by connection ribs 354.

In addition, sets of distance keeping members 450 arranged between the second radiation blocking film 220 and the second support plate 170 may be connected with each other by connection ribs 454. The sets of the distance keeping members 350 and 450 may be formed in the same shape.

Figure 7:
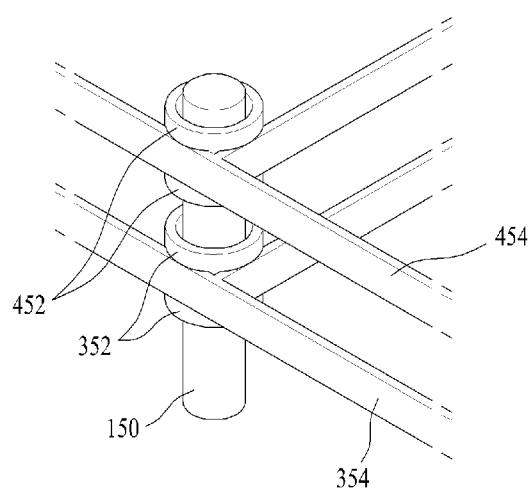
FIG. 7 is a perspective view illustrating a set of distance keeping members provided in one spacer.
Figure 8:
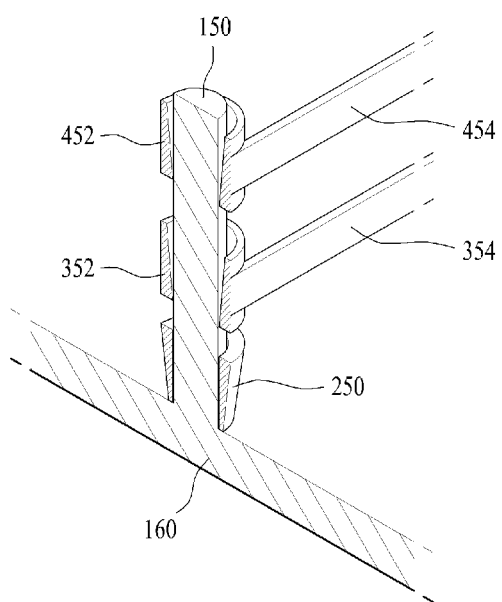
FIG. 8 is a sectional view illustrating one distance keeping member and a set of distance keeping members provided in one spacer.

FIG. 6 is a perspective view illustrating sets of distance keeping members integrally connected with each other. FIG. 7 is a perspective view illustrating a set of distance keeping members provided in one spacer. FIG. 8 is a sectional view illustrating one distance keeping member 250 and a set of distance keeping members 350 and 450 that are provided in one spacer.

The first set of the distance keeping members 350 includes a plurality of distance keeping members 352 arranged in vertical or horizontal lines and connection ribs 354 integrally provided in sides of the distance keeping members 352.

As shown in FIG. 6, the set of the first distance keeping members 350 may have 9 distance keeping members connected with each other by 12 connection ribs 354.

The number of the distance keeping members and connection ribs that form one set of the distance keeping members may be determined different from what is shown in FIG. 6. For instance, 16 distance keeping members are integrally connected with each other ± 24 connection ribs.

Moreover, one set of the distance keeping members 350 arranged between the pair of the radiation blocking films 210 and 220 may be independently provided from the sets of the distance keeping members arranged between the second radiation blocking film 220 and the second support plate 170.

Here, the distance keeping members 250 are combined and assembled with the first set of the first distance keeping members 350 and the second set of the distance keeping members 450.

Inner surfaces of the distance keeping members 352 and 452 may be inclined to reduce the heat transfer by reducing contact with the spacers 150.

As shown in the sectional view of FIG. 8, inner surfaces of the distance keeping member 352 composing the set of the first distance keeping members 350 and of the distance keeping members 452 composing the set of the second distance keeping members 450 may be getting inclined along a downward direction to make diameters of the distance keeping members 352 and 452 smaller along a downward direction.

Only the lowest portion of the inner surface of each distance keeping member 352 and 452 is in contact with the spacer 150. Accordingly, the amount of the conducted heat transferred to the distance keeping members 352 and 452 from the spacers 150 can be reduced as much as possible.

The lowest one of three distance keeping members shown in FIG. 8 (namely, the distance keeping member 250) has an outer surface inclined along a downward direction to make a diameter thereof getting smaller along a downward direction, not an inclined inner surface.

That is to minimize the contact area between the distance keeping member 250 and the first support plate 160.

In contrast, in case that the distance keeping member 250 is fixed to the second support plate 170, not to the first support plate 160, an inclined shape of the distance keeping member 250 should be the reverse of the inclined shape shown in FIG. 8. That is because the contact area between the second support plate 170 and the distance keeping member 250 has to be minimized.

Also, an inner surface of the distance keeping member 250 may be inclined to make a diameter of the distance keeping member 250 getting smaller along a downward direction.

The inclination direction may be formed to make the inner surface of the distance keeping member 250 getting smaller along an upward direction.

Inclination direction of other distance keeping members 352 and 452 may be formed along an upward direction as well as a downward direction.

Inclination directions of three distance keeping members 250, 352 and 452 may be differentiated before three distance keeping members are assembled to each other.

The connection ribs 354 and 454 integrally formed with the set of the distance keeping members 350 and 450 may be not in contact with the spacers, 150, the radiation blocking films 210 and 220 and the second support plate 170.

As shown in FIG. 7, the connection ribs 354 and 454 lower than the distance keeping members 352 and 452 are connected to middle portion of the distance keeping members 352 and 452.

Accordingly, while top surfaces or bottom surfaces of the distance keeping members 352 and may be in contact with the radiation blocking films 210 and 220 or the second support plate 160, the connection ribs 354 and 454 are formed not to be in contact with the radiation blocking films 210 and 220 or the second support plate 160, only to reduce the heat transfer generated by conduction as much as possible.

Figure 9:
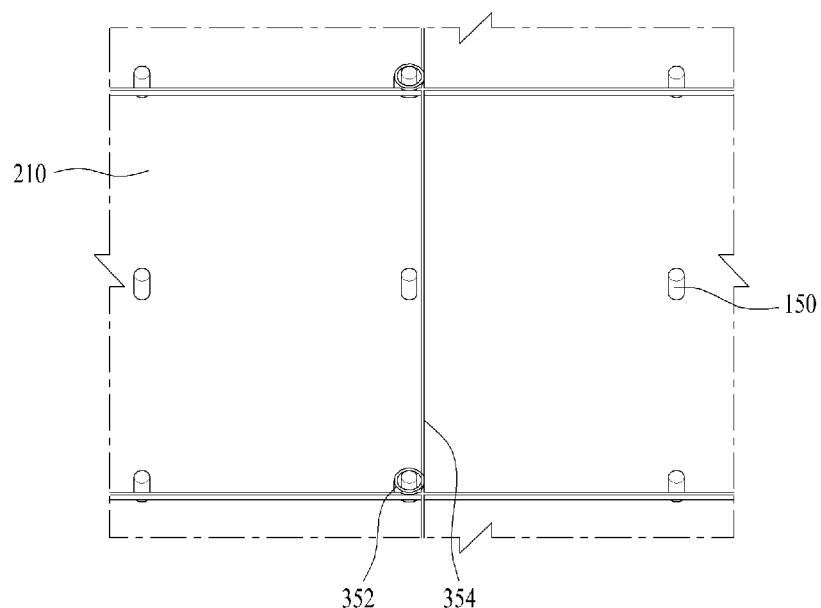
FIG. 9 is a perspective view illustrating a relative position of the set of the distance keeping members with respect to the spacer, seen above.
Figure 10:
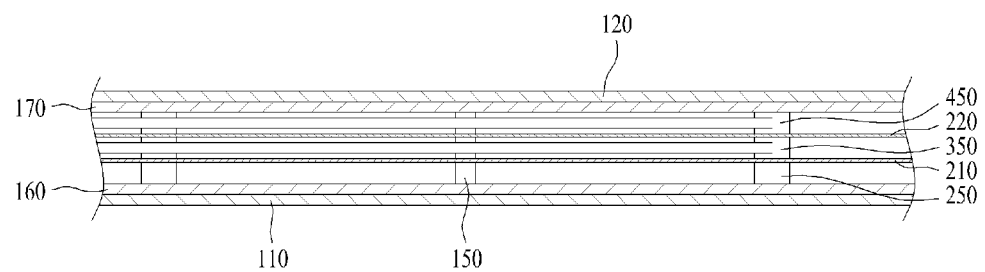
FIG. 10 is a partially cut-away sectional view of various parts provided between the inner case and the outer case.

As shown in FIG. 9, the connection ribs 354 of the set of the distance keeping members 350 and 450 may be arranged not to be in contact with a neighboring spacer 150 arranged nearby.

The set of the distance keeping members may be insertedly assembled to the plurality of the spacers 150 and also the heat transfer generated by conduction may be minimized.

Finally, the process of assembling the components composing the case of the refrigerator according to the present invention will be described.

In a perspective of FIG. 2 and a sectional view of FIG. 20, the inner case 110, the outer case 120 and the component parts insertedly assembled between the inner case 110 and the outer case are shown.

As shown in FIG. 4, the independently fabricated distance keeping members 250 are inserted in the predetermined number of the spacers 150 integrally formed with the first support plate 160.

Hence, one radiation blocking film 210 shown in FIG. 5 insertedly passes the through-holes 215. At this time, the radiation blocking film 210 is seated on top surfaces of the distance keeping members 250.

After that, the set of the first distance keeping members 350 is inserted in the spacers 150 to be seated on the radiation blocking film 210.

In other words, the second radiation blocking film 220 is inserted to enable the spacers 150 to pass through the through-holes.

The set of the second distance keeping members 450 is inserted to be seated on the radiation blocking film 220.

Hence, the second support plate 170 is disposed to enable the ends of the spacers 150 inserted in the grooves 175 of the second support plate 170.

The spacer set assembly with the radiation blocking film assembled as mentioned above may be inserted in the vacuum space 130 formed between the inner case 110 and the outer case 120.

A plurality of spacer set assemblies may be required to fill the vacuum space 130. A predetermined number of spacer set assemblies are continuously inserted in the vacuum space 130 and the assembly process of the refrigerator is completed.

Hence, referring to FIGS. 3 and 11, the structure and assembling method of the first support plate, the spacers and the second support plate will be described in detail.

FIG. 3 is a perspective view illustrating an assembling process of a first support plate, spacers and a second support plate. FIG. 11 is a perspective view illustrating a state where the first support plate, the spacers and the second support plate are assembled to each other.

As shown in the drawings, the spacers 150 may be aligned in vertical and horizontal lines.

The plurality of the spacers 150 integrally formed with the first support plate 160 may be arranged in upward/downward and rightward/leftward lines, as shown in FIG. 5.

The plurality of the spacers 150 arranged in lines facilitates not only the design and molding fabrication process but also the assembly process. In addition, the plurality of the spacers arranged in lines may make the strength and rigidity stronger which endures the vacuum pressure or an external shock after the assembly process.

An end of each spacer 150 may be concavely curved.

Figure 11:
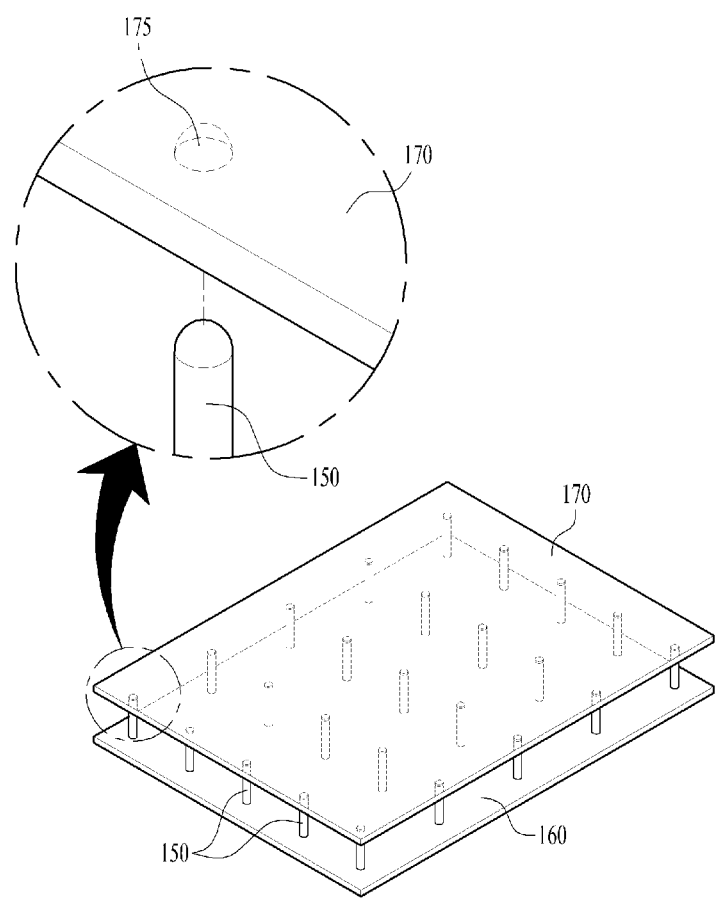
FIG. 11 is a perspective view illustrating a state where the first support plate, the spacers and the second support plate are assembled to each other.

As shown in a circle enlarged in FIG. 11, ends of the spacers 150 are concavely curved. In the assembly process, the end of each spacer 150 is easily seated in each groove 175 formed in the second support plate 170, only to ease the assembling work.

Moreover, it is more preferred that the plurality of the grooves 175 formed in the second support plate 170 are convexly curved, corresponding to the shape of the spacers 150.

The shapes of the grooves 175 formed in the second support plate 170 may be corresponding to the shapes of the spacers 150. Accordingly, it is easy to determine the positions of the spacers in the assembling work and the second support plate 170 can be fixed in parallel with the ends of the spacers, without movement.

The spacers 150, the first support plate 160 and the second support plate 170 may be formed of one of metal, ceramic and reinforced plastic.

The spacers 150 are provided in the vacuum space 130 formed between the inner case 110 and the outer case 120. The first support plate 160 and the second support plate 170 are in contact with the inner case 110 and the outer case 120, respectively.

Accordingly, the heat transfer from the outside of the outer case 120 into the inside of the inner case 110 has to be reduced as much as possible. External heat might be conducted via the second support plate 170, the spacers 150 and the first support plate 160.

It is preferred that the spacers 150, the first support plate 160 and the second support plate 170 provided between the inner case 110 and the outer case 120, in contact, are formed of one of metal, ceramic and reinforced plastic with a low heat conductivity.

The spacers and the like had better be formed of a material with a low heat conductivity and a good strength. It is more preferred that the above-mentioned components are formed of ceramic or reinforced plastic, not metal with a good strength but a relatively high heat conductivity.

Meanwhile, the case 1 may further include a metal coated part provided in at least predetermined portion of an outer surface of the first support plate 160 and an inner surface of the second support plate 170, to cut off radiant heat transfer.

Although not shown in the drawings, the metal coated part is a metal coated layer on an outer surface of the first support plate 160 or an inner surface of the second support plate 170, and it is configured to reduce the radiant heat transfer between the inner case 110 and the outer case 120.

The metal has a good radiant heat transfer blocking property. Although it has a relatively high heat conductivity, the metal can be coated to minimize the radiant heat transfer.

It is preferred that the metal coated part is provided on both the outer surface of the first support pate 160 and the inner surface of the second support plate 170 to minimize the radiant heat transfer.

Figure 12:
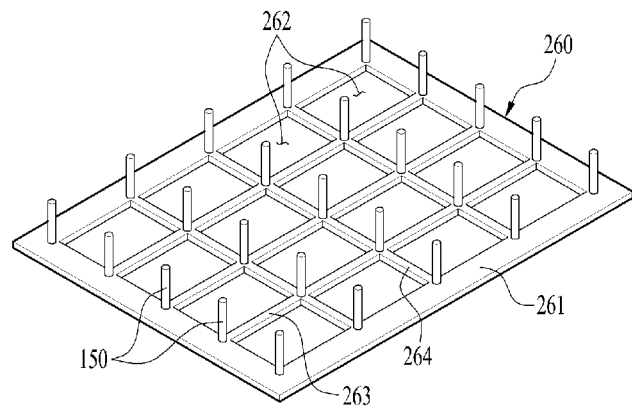
FIG. 12 is a perspective view illustrating a first support plate according to another embodiment.
Figure 13:
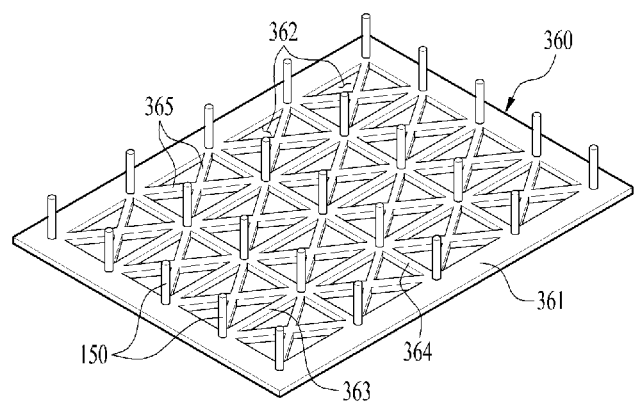
FIG. 13 is a perspective view illustrating a first support plate according to a further embodiment.

Referring to FIGS. 12 and 13, two embodiments of the first support plate will be described as follows.

First of all, it is shown in FIG. 12, that the spacers 150 are integrally formed with a first support plate 260 according to a second embodiment of the present invention.

Different from the first support plate 160 according to the first embodiment of the present invention described above, the second support plate 260 according to this embodiment includes a plurality of holes formed in an edge part of the first support plate 260 between the spacers 150. The holes 262 form empty spaces in the first support plate 260.

The reason why the holes 262 are formed in the first support plate 260 is that an outgassing phenomenon has to be prevented. Such an outgassing phenomenon means that fine atoms or molecules are leaked from a surface of the first support plate 260 positioned in the vacuum space 130 by the vacuum pressure.

In other words, a surface area of the first support plate 260 is reduced to reduce the material itself which can generate the outgassing.

The holes 262 are formed in the first support plate 260. Accordingly, the cost of material used in forming the first support plate can be reduced and the weight of the first support plate can be reduced.

As shown in FIG. 12, the spacers 150 are arranged in vertical and horizontal lines and four vertexes of one hole 262 are arranged to form a rectangle positioned adjacent to one space 150.

The shape of the hole is not limited to such a rectangle and it may be a hexagon, octagon, oval and so on.

Considering the positions of the spacers 150, the holes 262 should not interfere with the spacers 150, with a sufficient strength when the first support plate 160 supports the spacers 150.

The holes 262 formed in the first support plate 160 are arranged in an edge part 261 of the first support plate 160.

A first rib for connecting two spacers 150 in a horizontal direction and a second rib for connecting two spacers 150 in a vertical direction may be formed between each two of the holes 262.

As shown in FIG. 12, the spacers 150 may be arranged at intersection points between the first ribs 263 and the second ribs 264 or between the ribs and the edge part 261, respectively.

The edge part 261 of the first support plate 160 may have a larger width than the second rib 263 and the second rib 264 do.

Such the edge part 261 is employed to form an overall frame of the first support plate 160 and to provide a basic strength to the first support plate 160.

The second support plate 170 may include a plurality of holes, like the first support plate 160 shown in FIG. 12.

In this instance, the second support plate 170 may have a shape identical to the shape of the first support plate 260. Of course, the plurality of the grooves 175 mentioned above may be formed in the second support plate 170.

Lastly, FIG. 13 shows a first support plate 360 according to a third embodiment of the present invention where spacers 150 are integrally formed.

Different from the first support plate 260 according to the second embodiment, the first support plate 360 further include a reinforcing rib 365 provided in the hole 362 surrounded by ribs 363 and 364 to connect two or more spacers 150 with each other.

In other word, the first support plate 360 according to the third embodiment includes an edge part 361, holes 362 formed in areas surrounded by the spacers arranged along the edge part 361, a plurality of first ribs 363 for connecting the spacers in a first direction in the holes and a plurality of second ribs 364 for connecting the spacers in a second direction in the holes, with crossing the plurality of the second ribs. The first support plate 160 may further include a plurality of reinforcing ribs 365 provided between the first ribs and the second ribs to connect the spacers with each other.

For convenience sake, the holes 362 according to this embodiment form rectangles formed in the areas surrounded by the spacers 150 arranged along the edge part 361. The rectangles defined by virtual outlines except the ribs 363, 364 and 365 may be the holes.

Accordingly, the first support plate 360 according to the third embodiment is identical to the first support plate 260 according to the second embodiment, except the reinforcing ribs 365.

Such a reinforcing rib is configured to connect two of the spacers 150 arranged in a diagonal direction. Two of the reinforcing ribs cross each other at a middle portion.

Moreover, any types of reinforcing ribs may be applicable only if they are capable of reinforcing the strength of the first support plate 360 which the spacers 150 are integrally formed with. Such types include reinforcing ribs connected with the first ribs 363 or the second rib 364 in parallel.

The first support plate 160, 260 or 360 and the second support plate 170 are integrally formed with each other, even when they are any types. Accordingly, it is preferred that the first support plate and the second support plate are fabricated in a molding frame formed in a predetermined shape one time.

According to the refrigerator described above, it is very easy to insertedly assemble the spacers between the inner case and the outer case. Also, the structure of the refrigerator can endure the vacuum pressure of the vacuum space sufficiently and the vacuum space can reduce the radiant heat transferred via the vacuum space as much as possible, such that the refrigerator may have an excellent insulation performance.

Various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An appliance comprising:
an inner case corresponding to a storage space;
an outer case spaced apart by a distance from the inner case;
a vacuum space disposed between the outer case and the inner case, the vacuum space being maintained at a vacuum pressure and being configured to insulate the inner case from the outer case;
a supporting member configured to maintain the distance between the inner case and the outer case and configured to reduce deformation of the inner case and the outer case in response to an external shock;
a radiation blocking film provided in the vacuum space and spaced apart from the inner case and the outer case; and
a distance keeping member configured to support one surface of the radiation blocking film and positioned between the inner case and the radiation blocking film,
wherein the supporting member comprises:
a first support plate that extends in a different direction from a direction of a thickness of the vacuum space; and
a second support plate that is spaced apart from the first support plate in a direction of the thickness of the vacuum space.

2. The appliance of claim 1, wherein the first support plate is arranged between an inner surface of the outer case and an outer surface of the inner case.

3. The appliance of claim 1, wherein the radiation blocking film is disposed between the first support plate and the second support plate.

4. The appliance of claim 1, wherein the radiation blocking film is spaced apart from the first support plate and the second support plate.

5. An appliance comprising:
an inner case corresponding to a storage space;
an outer case spaced apart by a distance from the inner case;
a vacuum space disposed between the outer case and the inner case, is the vacuum space being maintained at a vacuum pressure, and being configured to insulate the inner case from the outer case;
a supporting member configured to maintain the distance between the inner case and the outer case and configured to reduce deformation of the inner case and the outer case in response to an external shock;
a radiation blocking film provided in the vacuum space and spaced apart from the inner case and the outer case; and
a distance keeping member configured to support one surface of the radiation blocking film and positioned between the inner case and the radiation blocking film,
wherein the supporting member comprises:
a first support plate has a portion that extends in a direction that the radiation blocking film extends; and
a second support plate that is spaced apart from the first support plate in a direction of a thickness of the vacuum space.

6. The appliance of claim 5, wherein the first support plate is arranged between an inner surface of the outer case and an outer surface of the inner case.

7. The appliance of claim 5, wherein the radiation blocking film is disposed between the first support plate and the second support plate.

8. The appliance of claim 5, wherein the radiation blocking film is spaced apart from the first support plate and the second support plate.

9. An appliance comprising:
an inner case corresponding to a storage space;
an outer case spaced apart by a distance from the inner case;
a vacuum space disposed between the outer case and the inner case, the vacuum space being maintained at a vacuum pressure and being configured to insulate the inner case from the outer case;

a supporting member configured to maintain the distance between the inner case and the outer case and configured to reduce deformation of the inner case and the outer case in response to an external shock;

a radiation blocking film provided in the vacuum space and spaced apart from the inner case and the outer case; and a distance keeping member configured to support one surface of the radiation blocking film and positioned between the inner case and the radiation blocking film, wherein the supporting member comprises a support plate that extends in a different direction from a direction of a thickness of the vacuum space, and the radiation blocking film is disposed between the support plate and the distance keeping member.

10. The appliance of claim 9, wherein the support plate is arranged between an inner surface of the outer case and an outer surface of the inner case.

11. The appliance of claim 9, wherein the distance keeping member has a portion that is inclined between the distance keeping member and the support plate to reduce a contact area with the support plate.

12. The appliance of claim 9, wherein the radiation blocking film is spaced apart from the support plate.

13. An appliance comprising:

an inner case corresponding to a storage space;

an outer case spaced apart by a distance from the inner case;

a vacuum space disposed between the outer case and the inner case, the vacuum space being maintained at a vacuum pressure, and being configured to insulate the inner case from the outer case;

a supporting member to maintain the distance between the inner case and the outer case and configured to reduce deformation of the inner case and the outer case in response to an external shock;

a radiation blocking film provided in the vacuum space and spaced apart from the inner case and the outer case; and a distance keeping member configured to support one surface of the radiation blocking film and be positioned between the radiation blocking film and at least one of the inner case and the outer case, wherein the supporting member comprises a spacer that extends in a direction of a thickness of the vacuum space, and the spacer and the distance keeping member are provided as a separate component.

14. The appliance of claim 13, wherein the spacer is arranged between an inner surface of the outer case and an outer surface of the inner case.

15. The appliance of claim 13, wherein an outer circumference of the distance keeping member is larger than an outer circumference of the spacer.

16. The appliance of claim 13, wherein the distance keeping member has a portion that is inclined between the distance keeping member and the spacer to reduce heat transfer by reducing contact area with the spacer.

17. The appliance of claim 13, wherein the spacer comprises a first spacer and a second spacer that is spaced apart from the first spacer.

18. An appliance comprising:

an inner case corresponding to a storage space;

an outer case spaced apart by a distance from the inner case;

a vacuum space disposed between the outer case and the inner case, the vacuum space being maintained at a vacuum pressure, and being configured to insulate the inner case from the outer case;

supporting members to maintain the distance between the inner case and the outer case and configured to reduce deformation of the inner case and the outer case in response to an external shock;

a radiation blocking film provided in the vacuum space and spaced apart from the inner case and the outer case; and at least one distance keeping member configured to support one surface of the radiation blocking film and be positioned between the radiation blocking film and at least one of the inner case and the outer case, wherein the supporting members comprise spacers that extend in a direction of a thickness of the vacuum space, and the at least one distance keeping member is provided in a predetermined number of the spacers to reduce a heat which is conducted via the spacers and the at least one distance keeping member.

19. The appliance of claim 18, wherein the at least one distance keeping member has a portion that is inclined between the at least one distance keeping member and the spacers to reduce heat transfer by reducing contact area with the spacers.

* * * * *